Patented Feb. 3, 1925.

1,525,096

UNITED STATES PATENT OFFICE.

BO MICHÄEL STURE KALLING, OSCAR GEORG SAMUEL ANDERSON, AND SVEN DAGOBERT DANIELI, OF TROLLHATTAN, SWEDEN, ASSIGNORS TO AKTIEBOLAGET FERROLEGERINGAR, OF STOCKHOLM, SWEDEN, A JOINT-STOCK COMPANY LIMITED, OF SWEDEN.

PROCESS FOR SUPPLYING HEAT TO A METAL.

No Drawing. Application filed May 16, 1923. Serial No. 639,466.

*To all whom it may concern:*

Be it known that we, Bo MICHÄEL STURE KALLING, OSCAR GEORG SAMUEL ANDERSON, and SVEN DAGOBERT DANIELI, engineers, subjects of the King of Sweden, and residents of Trollhattan, in the Kingdom of Sweden, have invented new and useful Improvements in Processes for Supplying Heat to a Metal, of which the following is a specification.

The present invention, which is intended in an effective manner to supply heat to a metal (which term in this description and in the claims includes not only pure metals but also metal alloys or a mixture of one or more metals with one or more metal alloys) covered with molten slag, and preferably to bring metal in a molten condition, is based on the following observation.

If in a suitable container, for example a furnace chamber, there is a bath of a molten slag, and if the one end of a rod of metal e. g. of iron, is kept immersed in this bath, and a sufficiently strong electric current is caused to pass from the tip of the rod, plunged into the slag bath, to the slag bath, the tip of the metal rod will naturally melt, and the molten metal thereby formed, provided its specific weight exceeds that of the molten slag, will sink down through the slag bath to the bottom of the container. It would be supposed that the temperature of the molten metal thus obtained would, as a rule, be very close to its melting point, but, remarkably enough, it is possible in this manner to effect the superheating of the metal to a quite unexpected extent. Thus, for example, it has been found possible to get the molten metal so super-heated as to contain per unit of weight a quantity of heat more than double as great as the heat which it contains at its melting-point.

This observed phenomenon is utilized in the present invention in order to supply heat to a metal covered with slag and preferably to bring metal in a molten condition, in the following manner:—

The metal, to which heat is to be supplied, is covered with a slag bath of sufficient depth. A part of a suitably shaped body, for example the one end of a rod consisting of a metal whose specific weight is higher than that of the slag bath, and whose melting point is not too much below the temperature of said metal covered by the slag and to which heat is to be supplied, is plunged into this slag bath. A rod of the same metal as that to which heat is to be supplied naturally answers to said conditions. In one or another known way (for example by bringing the said body immersed into the slag bath and the slag bath itself into electric connection each with its pole of a transformer of such kind that it can supply electric current of a voltage and strength suitable for the particular case) a sufficiently powerful electric current is caused to pass between the metal body immersed into the slag bath and the slag bath itself. That part of the metal body which is immersed in the slag bath is thereby melted, and the molten metal thus obtained sinks in a superheated condition through the slag down to the metal under the slag, and whilst—in certain cases—it alloys itself with the metal, gives off heat to it. By successively feeding down the said current-carrying metal body, according as it melts off, into the slag, it is of course possible to supply heat to the metal under the slag as long as desired.

The present process or method may also be carried out in the following manner:—

The metal to which heat is to be supplied is added successively, to the slag bath, simultaneously or alternately with the supply of electric energy. The metal thus supplied sinks down through the slag and comes there into contact with superheated metal derived from the current-carrying metal body, and absorbs heat. By a suitable proportioning of the relation between the quantity of metal supplied from the current-carrying metal body and metal supplied in another way, it is possible to effect that the latter, although supplied in a solid form, shall be brought into a molten condition, and, in certain cases, alloy itself with the superheated metal derived from the current-carrying body.

In order to elucidate the nature and value of the invention the following description of its application to the manufacture of iron rich in chromium and with a low percentage of carbon is given by way of example.

For the manufacture of a ferro-chromium alloy with, for example, about 14% of chromium and less than 0.05% of carbon, the following form of execution of the invention may be applied:—

Into an electric furnace connected to a single-phase transformer of suitable size and with a single movable electrode, for example of the Girod type, 1500 kilograms of molten iron, containing 0.03% of carbon and otherwise free from appreciable quantities of injurious impurities, is introduced from another furnace, e. g. an open-hearth furnace. On the surface of this iron bath, a slag bath of suitable depth and composition is prepared in one way or another, for example by smelting—with the aid of electric energy supplied through the carbon electrode of the furnace—a suitable quantity of a mixture of lime, quartz, and chrome ore. In this special case the slag should suitably contain chromic oxide in order to prevent the oxidation of the chromium of the steel bath. When the slag bath has thus been prepared or formed, the carbon electrode of the furnace is exchanged for a preferably round rod of soft iron, the rod being of a suitable length for the purpose and having a diameter of e. g. 20 centimeters, and with a carbon content of 0.05%, whereupon the free end of said rod is immersed in the slag bath. If the transformer of the furnace supplies current with a tension of 60 volts and if the iron rod is immersed to such a depth that the electric current will be about 10,000 amperes, corresponding to a load of about 500 kilowatts, the end of the iron rod immersed in the slag immediately begins to melt, and the melting proceeds under the above stated conditions at a rate of about 2½ centimeters per minute, provided the load on the furnace is kept approximately constant by successively feeding down the iron rod as it melts away at its lower end. The iron melted off from the iron rod becomes excessively superheated and, as it alloys itself with the iron bath, raises the temperature of the latter. Solid ferro-chromium with 65% of chromium and 0.07% of carbon, crushed into small fragments, is thrown successively into the furnace simultaneously with the melting down of the iron rod. This chromium alloy sinks through the slag bath down into the iron bath, absorbs heat from the latter and, provided the supply of the chromium alloy does not proceed at a greater rate than corresponds to about 450 kilograms per hour, the chromium alloy melts and alloys itself with the iron bath. After 550 kilograms of the chromium alloy have thus been successively fed in or added for altogether about one hour and a quarter, the bath is ready and the supply of current is interrupted, whereupon the content of the furnace in a known manner is tapped for further treatment. About 2½ tons of alloy with circa 14% chromium and less than 0.05% carbon are then obtained from the furnace. The consumption of energy per kilogram thus melted and properly super-heated metal, apart from the energy consumed in the preparation of the slag, will be about 0.6 kilowatt-hours. If, on the other hand, it were attempted to manufacture the alloy in question by supplying heat through the carbon electrode of the furnace whilst simultaneously charging a suitable quantity of ferro-chromium, the consumption of energy would have been considerably higher, and moreover the bath would unavoidably have absorbed very considerable quantities of carbon from the furnace gases.

In order further to make plain the invention, it may be pointed out that the above figures with respect to quantity, composition, etc., obviously do not limit the scope of the invention, but have only been mentioned in order to give an idea of the practical value of the invention.

It may also be pointed out that there is no objection in principle to allowing the current-carrying metal rod to consist of the same metal as is otherwise supplied to the process, for instance in the example above described, of ferro-chromium poor in carbon.

In order further to elucidate the invention it may by way of example be pointed out that the present invention may for instance also be used for the manufacture of alloys of copper and zinc in the following way:—

A melted slag is first produced in any suitable manner in an apparatus suitable for the purpose e. g. in a melting pot or crucible of suitable dimensions.

The melting point of said slag should be lower than the boiling point of the zinc. A slag consisting of magnesium chloride eventually in mixture with sodium chloride may be suitable for said purpose. In this slag the lower ends of two rods (or two groups of rods) of copper of suitable dimensions are kept immersed, whereas the other ends of said rods are each electrically connected with corresponding poles of an electric source, for instance a transformer which is able to give off alternating current of suitable strength and voltage. Then the electric current immediately begins to flow between the points or ends of said rods kept immersed within the slag. By regulating the strength of current in a way suitable for the purpose the ends of said copper rods kept immersed in the slag are melted off by the influence of the current in such a way that a desired quantity of the copper is melted per unit of time. The copper thus melted off from the rods sinks down through the slag to the bottom of the crucible. Simultaneously with the melting of the copper in said way by the influence of electric energy pieces of zinc are successively charged into the crucible, which zinc also sinks down through the slag and comes in contact with the melted copper, takes up heat from the same and alloys itself with the copper. By regulating the quantity of zinc charged in said way per unit of time it is possible to bring about that the heat carried down into the crucible by the copper melted off from the rods is exactly sufficient for bringing the zinc charged into the crucible to melt without that any superheating of the zinc needs to take place. Thus it is in this way possible to produce an alloy of any desired composition without that practically speaking any evaporation of the zinc takes place. When a desired quantity of alloy has been formed in the crucible in this way, the crucible is discharged or emptied whereafter the process may again be repeated.

Instead of using pure zinc for the charge suitable alloys of zinc may also be used. This process has the advantages that it may be carried out practically speaking without any loss of metals and with a very low consumption of energy besides which very simple apparatuses are required for carrying out the process.

It ought to be obvious that alloys of other metals may be manufactured in analogous way as alloys of copper and zinc.

The expression "electrode" in the specification and claims is intended to include also two or more electrodes.

Having thus described our invention we declare that what we claim is:

1. The process of electrically fusing a metal in a suitable receptacle which consists in forming part of the metal to be fused into an electrode, keeping one end of this electrode immersed to a suitable depth in a bath of molten slag of suitable composition and specific gravity, the rest of the metal to be fused being introduced in solid state under the bath of the slag, a voltage being produced and maintained between said metal electrode and the bath of the slag sufficient to cause the passing between the electrode and the slag of electric currents of such an amperage that the fused metal dropping down from the electrode through the slag becomes sufficiently superheated for fusing the metal introduced under the bath of the slag without being itself solidified.

2. The process of electrically producing an alloy in a suitable receptacle, which consists in forming part of the metal intended to enter the desired alloy into an electrode, keeping one end of this electrode immersed to a suitable depth in a bath of molten slag of suitable composition and specific gravity, the rest of the metal intended to enter the desired alloy being introduced in solid state under the bath of slag, a voltage being produced and maintained between said metal electrode and the bath of the slag sufficient to cause the passing between the electrode and the slag of the electric currents of such an amperage that the fused metal dropping down from the electrode through the slag becomes sufficiently superheated for fusing the metal introduced under the slag and forming the desired alloy therewith without being itself solidified.

3. The process of electrically producing an alloy, which consists in producing in a suitable receptacle a bath of molten slag of suitable composition and specific gravity which covers a molten bath consisting of part of the metal intended to enter the desired alloy, keeping one end of an electrode formed of metal intended to enter the desired alloy immersed to a suitable depth in the bath of the slag, producing and maintaining a voltage between the bath of the slag and the end of the metal electrode kept immersed therein sufficient to cause the passing between the slag and the electrode of electric currents of such an amperage that the fused metal dropping down from the electrode through the slag to the metal bath thereunder becomes sufficiently superheated for compensating the lowering of the temperature of the metal bath caused by the introduction in solid state thereinto of the rest of the metal intended to enter the desired alloy, all the metal thus introduced into the receptacle forming the desired alloy in fluid state.

4. The process of electrically fusing low carbon ferro-chromium in a suitable receptacle, which consists in forming part of the ferro-chromium to be fused into an electrode, keeping one end of this electrode immersed to a suitable depth in a bath of molten slag of suitable composition and specific gravity, the rest of the ferro-chromium to be fused being introduced in solid state under the bath of the slag, a voltage being produced and maintained between said ferro-chromium electrode and the bath of the slag sufficient to cause the passing between the electrode and the slag of electric currents of such an amperage that the fused metal dropping down from the electrode through the slag becomes sufficiently superheated for fusing part of or all the ferro-chromium introduced under the bath of the slag without being itself solidified.

5. The process of electrically producing a low-carbon ferro-chromium, e. g. stainless steel or iron, which consists in producing, in a suitable receptacle or furnace, a bath of molten slag of suitable composition and specific gravity which covers a molten bath of low-carbon iron of suitable composition, keeping one end of an electrode of low-carbon ferro-chromium immersed to a suitable depth in the bath of the slag, producing and maintaining a voltage between the bath of the slag and the end of the metal electrode kept immersed therein sufficient to cause the passing between the slag and the electrode of electric currents of such an amperage that the fused metal dropping down from the electrode through the slag to the metal bath thereunder becomes sufficiently superheated for compensating the lowering of the temperature of the metal bath caused by the introduction thereinto in solid state of a quantity of low-carbon ferro-chromium sufficient to bring the chromium content of the thus produced alloy to the desired height.

6. The process of electrically producing a low-carbon ferro-chromium, e. g., stainless steel or iron, which consists in producing in a suitable receptacle or furnace a bath of molten slag of suitable composition and specific gravity which covers a molten bath of low-carbon iron of suitable composition, keeping one end of an electrode of low-carbon iron immersed to suitable depth in the bath of the slag, producing and maintaining a voltage between the bath of the slag and the end of the iron electrode kept immersed therein sufficient to cause the passing between the slag and the electrode of electric currents of such an amperage that the fused iron dropping down from the electrode through the slag to the metal bath thereunder becomes sufficiently superheated for compensating the lowering of the temperature of the metal bath caused by the introduction thereinto in solid state of a quantity of low-carbon ferro-chromium sufficient to bring the chromium-content of the thus produced alloy to the desired height.

7. The process of electrically producing a copper-zinc-alloy, which consists in producing in a suitable receptacle or furnace a bath of slag of suitable composition and specific gravity, keeping immersed to a suitable depth therein one end of an electrode of copper, producing and maintaining a voltage between the bath of the slag and the copper electrode sufficient to cause the passing between the slag and the electrode of electric currents of such an amperage that the fused copper dropping down from the electrode through the slag becomes sufficiently superheated for fusing, without being itself solidified, a suitable quantity of zinc or of alloys of zinc introduced in solid state into the receptacle or furnace under the bath of the slag and forming an alloy of desired composition therewith.

In testimony whereof we have signed our names to this specification.

BO MICHÄEL STURE KALLING.
OSCAR GEORG SAMUEL ANDERSON.
SVEN DAGOBERT DANIELI.

Witnesses:
OSCAR SWANBERG,
KARL E. HOTT.